United States Patent
Jourdan et al.

(10) Patent No.: US 7,899,620 B2
(45) Date of Patent: Mar. 1, 2011

(54) TERRAIN AVOIDANCE METHOD AND SYSTEM FOR AN AIRCRAFT

(75) Inventors: Christophe Jourdan, Toulouse (FR); Pierre Fabre, Toulouse (FR); Stephane Walter, Brax (FR); Isabelle Lacaze, Colomiers (FR)

(73) Assignee: Airbus France, Toulouse (FR)

( * ) Notice: Subject to any disclaimer, the term of this patent is extended or adjusted under 35 U.S.C. 154(b) by 767 days.

(21) Appl. No.: 11/908,786

(22) PCT Filed: Mar. 1, 2006

(86) PCT No.: PCT/FR2006/000457
§ 371 (c)(1),
(2), (4) Date: Sep. 14, 2007

(87) PCT Pub. No.: WO2006/097592
PCT Pub. Date: Sep. 21, 2006

(65) Prior Publication Data
US 2008/0215195 A1 Sep. 4, 2008

(30) Foreign Application Priority Data
Mar. 17, 2005 (FR) ................. 05 02654

(51) Int. Cl.
*G08G 1/16* (2006.01)
(52) U.S. Cl. .............. 701/301; 701/5; 340/945
(58) Field of Classification Search ........... 701/5, 701/301; 340/945, 963
See application file for complete search history.

(56) References Cited

U.S. PATENT DOCUMENTS

| 3,188,632 | A | | 6/1965 | Jeromson | |
|---|---|---|---|---|---|
| 4,924,401 | A | | 5/1990 | Bice et al. | |
| 5,442,556 | A | * | 8/1995 | Boyes et al. | 701/9 |
| 6,088,654 | A | * | 7/2000 | Lepere et al. | 701/301 |
| 6,161,063 | A | * | 12/2000 | Deker | 701/4 |
| 6,480,120 | B1 | * | 11/2002 | Meunier | 340/970 |
| 7,120,540 | B2 | * | 10/2006 | Meunier | 701/301 |
| 7,321,813 | B2 | * | 1/2008 | Meunier | 701/10 |

(Continued)

FOREIGN PATENT DOCUMENTS

GB 2310184 8/1997

OTHER PUBLICATIONS

International Search Report dated Jun. 16, 2006.

*Primary Examiner* — Mark Hellner
*Assistant Examiner* — Helal A Algahaim
(74) *Attorney, Agent, or Firm* — Dickinson Wright PLLC

(57) ABSTRACT

A terrain avoidance method and system for an aircraft includes a collision alarm device and an auto-pilot device including a first determination unit for determining a climbing order with optimal slope for the aircraft, a checking unit for checking whether a first altitude gain at the relief, by applying the optimal slope climbing order, is sufficient for clearing said relief, a finding unit for finding if at least one heading variation value exists, for which the corresponding altitude gain is sufficient to clear the relief, and a switching and calculating unit for applying to the aircraft, if the first altitude gain is sufficient, an optimal slope climbing order with an order to maintain the current heading and, if the first altitude gain is insufficient, a particular climbing order sufficient to clear the relief, with a heading order which corresponds to the selected heading variation value.

18 Claims, 4 Drawing Sheets

U.S. PATENT DOCUMENTS

| | | |
|---|---|---|
| 7,493,197 B2 * | 2/2009 | Bitar et al. .................... 701/14 |
| 7,696,904 B2 * | 4/2010 | Horvath et al. .............. 340/961 |
| 7,714,744 B1 * | 5/2010 | Wichgers .................... 340/965 |
| 2004/0078122 A1 * | 4/2004 | Pippenger ...................... 701/3 |
| 2004/0215372 A1 * | 10/2004 | Bateman et al. ................ 701/1 |
| 2005/0004723 A1 * | 1/2005 | Duggan et al. ................ 701/24 |
| 2005/0165516 A1 * | 7/2005 | Haissig et al. .................. 701/4 |
| 2005/0261808 A1 * | 11/2005 | Artini et al. .................... 701/3 |
| 2005/0261811 A1 * | 11/2005 | Artini et al. .................... 701/3 |
| 2006/0052912 A1 * | 3/2006 | Meunier ...................... 701/10 |
| 2006/0074559 A1 * | 4/2006 | Meunier ..................... 701/301 |
| 2006/0290531 A1 * | 12/2006 | Reynolds et al. ............ 340/961 |
| 2009/0069959 A1 * | 3/2009 | Horvath et al. ................. 701/8 |

* cited by examiner

TERRAIN AVOIDANCE METHOD AND SYSTEM FOR AN AIRCRAFT

TECHNICAL FIELD OF THE INVENTION

The present invention relates to a terrain avoidance method and system for an aircraft.

BACKGROUND OF THE INVENTION

It is known that many aircraft, in particular civil transport aircraft, are equipped with a collision warning device making it possible to transmit a warning signal when there is a risk of collision of the aircraft with the terrain. With regard to the collision warning device, this can in particular be a TAWS (Terrain Awareness and Warning System) device, in particular of the EGPWS (Enhanced Ground Proximity Warning System) type or of the GCAS (Ground Collision Avoidance System) type.

When such a collision warning device transmits a warning signal, it is generally up to the pilot to take all action, in particular to pilot the aircraft manually in order to avoid a collision with the terrain.

The patent U.S. Pat. No. 4,924,401 proposes a solution having the purpose of automatically avoiding a collision of the aircraft with the terrain. This solution consists in defining a minimum altitude below which the aircraft must not descend and in automatically piloting the aircraft, by means of an automatic pilot, when that minimum altitude is passed through in descent, in such as way as to then automatically instruct the aircraft to climb and thus to prevent any collision with the terrain.

However, this known solution is particularly adapted to the case where the pilot is unconscious whilst the aircraft is in a dive. Because of this it has the disadvantage of acting very late in the aircraft's trajectory and the action on this trajectory of course is greater as it becomes later. Also, applied to a large passenger aircraft for example, this known solution causes an uncomfortable situation, or even a potential danger for the passengers. Moreover, the risk that the action of the trajectory will not protect the aircraft from a collision with the terrain is also high because of this late action.

SUMMARY OF THE INVENTION

The purpose of the present invention is to overcome these disadvantages. It relates to a particularly effective terrain avoidance method for an aircraft.

For this purpose, according to the invention, said method according to which there is used a collision warning device which monitors the flight of the aircraft with respect to the surrounding terrain and which is able to transmit a warning signal when there is a risk of a collision between the aircraft and a relief of the terrain by maintaining its current flight characteristics (speed, slope, etc), is noteworthy in that, when said collision warning device transmits a warning signal, automatically:

A/ an optimal slope climb command for the aircraft is determined;

B/ it is checked if a first altitude gain (which is obtained at said relief by the aircraft, by applying said optimal slope climb command to it with a command to maintain the current heading), is sufficient to clear said relief; and C/ according to this check:

a) if said first altitude gain is sufficient to clear said relief, said optimal slope climb command is applied to the aircraft with a command to maintain the current heading; and b) if said first altitude gain is not sufficient to clear said relief, a search is carried out to see if there is at least one heading variation value for which a second altitude gain which is obtained at the relief by the aircraft (on applying to it an optimal slope climb command) is sufficient to clear said relief, and if it is so:

α) one of said heading variation values making it possible to clear the relief is selected; and β) a particular climb command which is sufficient to clear the relief is applied to the aircraft, with a heading command which corresponds to the heading variation value thus selected (and which therefore generates a heading variation of the aircraft).

The method according to the invention has the advantage of acting on the trajectory of the aircraft as soon as a risk of collision with the relief of the terrain has been detected, and this action is carried out automatically, that is to say without the intervention of the pilot. Thus, when a warning signal is transmitted, automatic action is taken in such a way as to improve the situation of the aircraft with respect to the terrain, by applying a climb command, generally an optimal slope climb command (with regard to the aircraft performance) as described below.

In order to do this, according to the invention:

if such an action is sufficient to clear the relief, there is simply applied to the aircraft an optimal slope climb command without modifying its heading, which makes it possible to carry out a simplified avoidance maneuver; and if the above simplified maneuver is not sufficient to clear the relief, which can happen in certain circumstances (very high relief, etc), the heading of the aircraft is modified in order to steer it in a direction in which the relief is not too high, and then there is (simply) applied to it a particular climb command which is sufficient to clear the relief in that direction.

Thus, due to the invention, there is in principle the ability to clear any relief which is situated in front of the aircraft.

In the context of the present invention:

"slope" means both the actual slope and the attitude angle of the aircraft; and

"heading" means both the actual heading and the route of the aircraft.

Moreover, in the context of the present invention, the optimal slope climb command is determined taking account of an associated thrust command in order to be able to maximize the slope. As the maximal slope corresponding to the current thrust of the aircraft is not necessarily the highest, a thrust command is determined for which the maximal slope is the highest possible.

In a first simplified embodiment, said particular climb command, which is applied to the aircraft in step C.b.β, corresponds to an optimal slope climb command.

In a second embodiment, there is determined, as a particular climb command (at non-maximal slope) generating an altitude gain at the relief which corresponds to an altitude gain that is both necessary and sufficient to clear said relief. In this second embodiment, the method preferably begins by determining a heading (or route) value making it possible to minimize the route deviation of the aircraft, then there is determined a climb command (at non-maximal slope) making it possible to clear the relief whilst minimizing the change in slope (passenger comfort). This second embodiment therefore makes it possible to improve passenger comfort (because of a low slope and a low acceleration) without being prejudicial to the safety of the aircraft, since the altitude gain is sufficient to clear said relief. This second embodiment of course applies solely in the case where the altitude gain necessary to clear the relief is less than the altitude gain obtained on applying to the aircraft an optimal slope climb command, since, if this is not so, the latter climb command is applied.

Furthermore, the particular climb command sufficient to clear the relief is preferably calculated taking account of an altitude margin with respect to that relief (safety margin).

Furthermore, in step C.b.α, there is preferably selected (from among all of the heading variation values found) the smallest heading variation value, in absolute value, which makes it possible to divert the aircraft from its current heading as little as possible, that is to say from the initially predicted lateral flight path.

In the context of the present invention, it is of course possible to envisage other variants of the heading variation value selection used in step C.b.α. In particular:

in a first variant, there is selected the heading variation value which corresponds to the lowest relief and which is situated in a predetermined heading variation range, defined on either side of the current heading of the aircraft;

in a second variant, there is selected the heading variation value for which the roll angle necessary for the corresponding heading change is, in absolute value, less than a predetermined value, for example less than 45°, in order not to degrade the climb performance of the aircraft too much (maximum possible slope).

In a particular embodiment, in step C.b.β, there is firstly applied said particular climb command, then there is applied said heading command generating a change of heading. This makes it possible to anticipate the climb command as early as possible and therefore to maximize the altitude gain obtained at the relief.

Furthermore, in a particular embodiment, when said collision warning device transmits a warning signal, the aerodynamic configuration of the aircraft is modified in such a way as to increase the altitude gain at the relief, and there is determined, in step A, an optimal slope climb command, taking account of the new aerodynamic configuration of the aircraft (resulting from this modification). This particular embodiment makes it possible to increase the altitude gain obtained at the relief. This embodiment can in particular be applied on an aircraft during an approach to an airport, for which the undercarriages are deployed, as are the slats, the flaps and/or the spoilers. In this case, the modification of the aerodynamic configuration sometimes consists simply in retracting these various items in order to obtain a better climb slope. However, in certain situations, it is more advantageous to leave certain items at least partially deployed (in particular the slats or flaps). In fact, the aerodynamic configuration of the aircraft is modified in such a way as to optimize the climb performance of the aircraft. The modification of the aerodynamic configuration can be carried out either automatically or by the pilot (by procedure).

Advantageously, when a heading command generating a heading variation is applied in step C.b.β, an identification signal is transmitted in the piloting position in order to inform a pilot of the application of this (heading variation) command. For this purpose, it is possible to indicate said heading variation command to the pilot, and also the climb command and the engagement of the terrain avoidance function.

Furthermore, when a risk of collision disappears, the aircraft is preferably returned into an operational flight envelope.

The present invention also relates to a terrain avoidance system for an aircraft.

According to the invention, said system of the type comprising:

a collision warning device which monitors the flight of the aircraft with respect to the surrounding terrain and which is able to transmit a warning signal when there is a risk of collision between the aircraft and a relief of the terrain if it maintains its current flight characteristics; and an automatic piloting device of the aircraft, is noteworthy in that said automatic piloting device comprises at least:

a first means of determining an optimal slope climb command for the aircraft;

a second means for checking if a first altitude gain (which is obtained by the aircraft at said relief on applying to it said optimal slope climb command whilst maintaining the current heading) is sufficient to clear said relief;

a third means to find out, when said first altitude gain is not sufficient to clear said relief, if there is at least one heading variation value for which a second altitude gain which is obtained at the relief by the aircraft (on applying to it an optimal slope climb command) is sufficient to clear said relief;

a fourth means for selecting, if necessary, one of said heading variation values making it possible to clear the relief; and a fifth means for applying to the aircraft a climb command and a heading command, namely:

if said first altitude gain is sufficient to clear said relief, said optimal slope climb command with a command to maintain the current heading;

if said altitude gain is not sufficient to clear said relief, a particular climb command which is sufficient to clear the relief, with a heading command which corresponds to the heading variation value selected by said fourth means (and which therefore generates a heading variation of the aircraft).

In a particular embodiment, said avoidance system also comprises:

an indicating means automatically signaling the application of a heading command generating a heading variation, that is to say resulting in a lateral avoidance of the relief; and/or a means of optimizing the aerodynamic configuration.

Moreover, said avoidance system advantageously furthermore comprises a means allowing the pilot to disengage it. In this case, said avoidance system can inform the pilot how to carry out the altitude and heading variations necessary for avoiding the relief (for example by means of an altitude and direction indicator which would indicate the attitude and the heading to assume).

Moreover, said automatic piloting device advantageously is part of an automatic pilot of the aircraft.

The appended drawings will give a good understanding of how the invention can be embodied. In these figures, identical references denote similar elements.

DETAILED DESCRIPTION OF THE INVENTION

Figure 1:
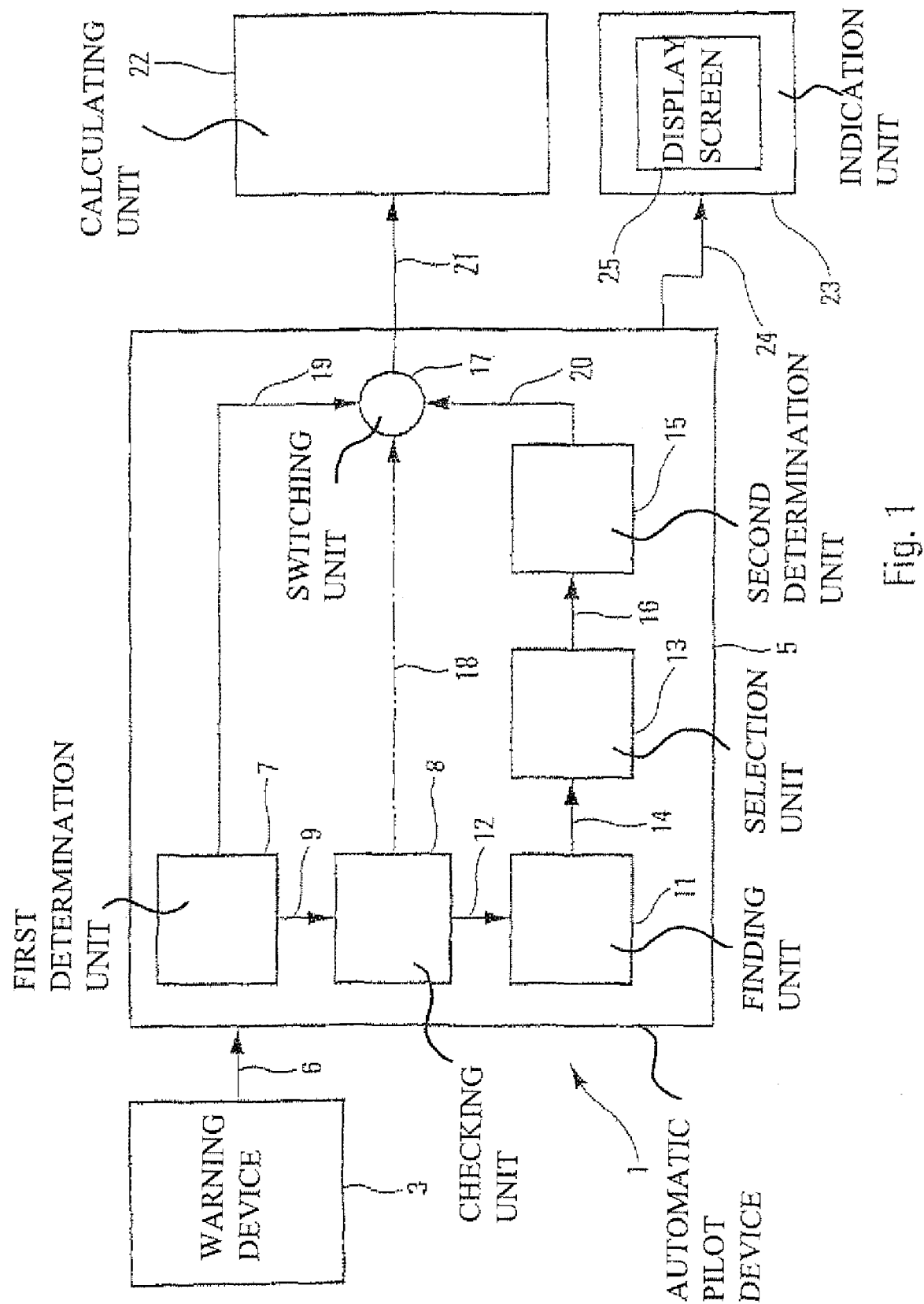
FIG. 1 is a block diagram of a system according to the invention.

The system 1 according to the invention and shown diagrammatically in FIG. 1 is a terrain 2 avoidance system, for an aircraft A, in particular a large transport aircraft.

In order to do this, said system 1 is of the type comprising:
- a usual collision warning device 3 which monitors the flight of the aircraft A with respect to the surrounding terrain 2 and which is able to transmit a warning signal when there is a risk of collision between the aircraft A and a relief 4 of said terrain 2 if it maintains its current flight characteristics (speed, slope, etc); and
- an automatic piloting device 5 of the aircraft A, which is connected by a connection 6 to said collision warning device 3.

With regard to said collision warning device 3, it can in particular be a TAWS (Terrain Awareness and Warning System) device, particularly of the EGPWS (Enhanced Ground Proximity Warning System) type or of the GCAS (Ground Collision Avoidance System) type.

Figure 2:
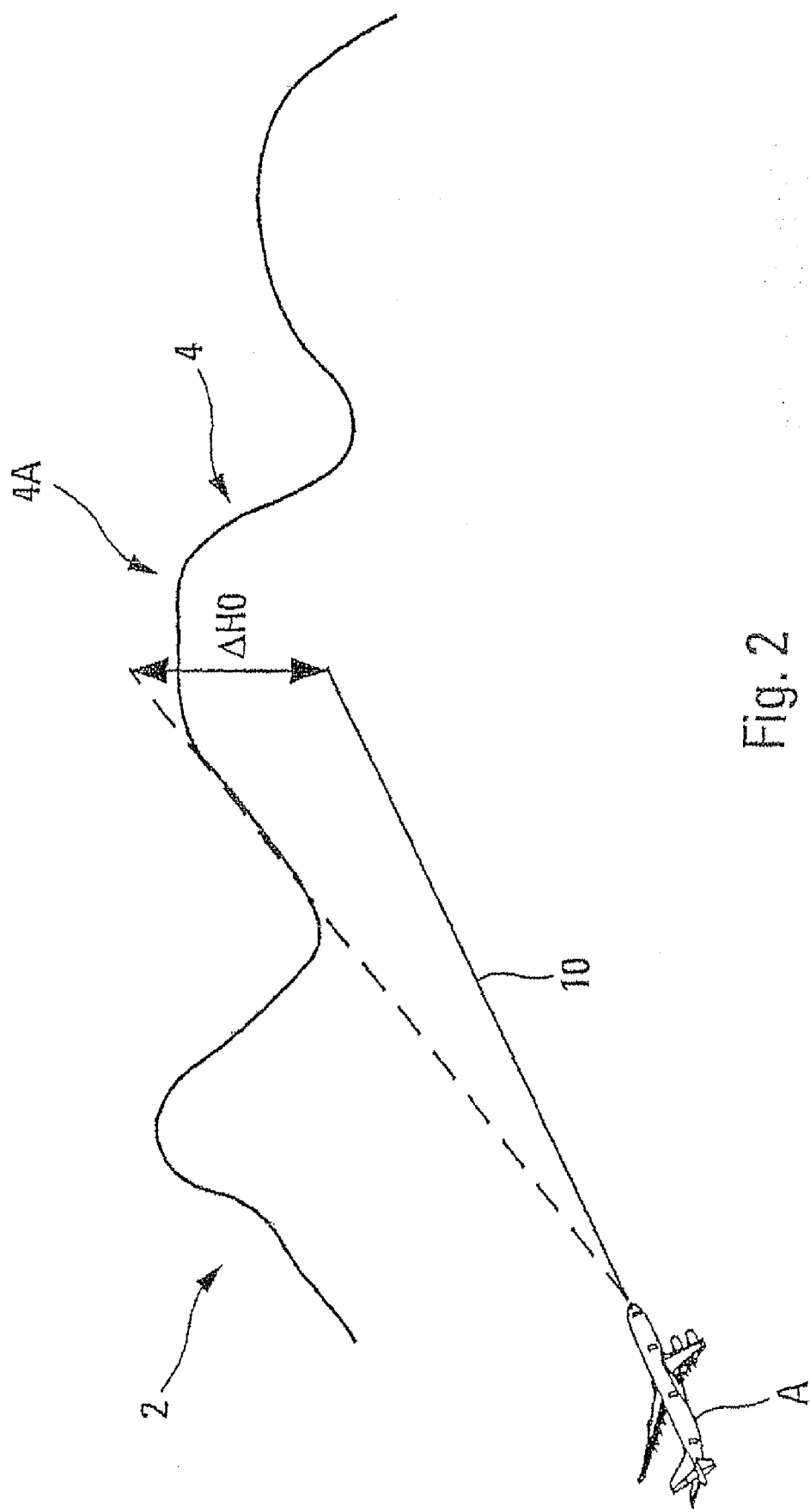
FIGS. 2 to 4 are diagrammatic representations of various flight situations making it possible to give a good explanation of the essential features of a system according to the invention.
Figure 3:
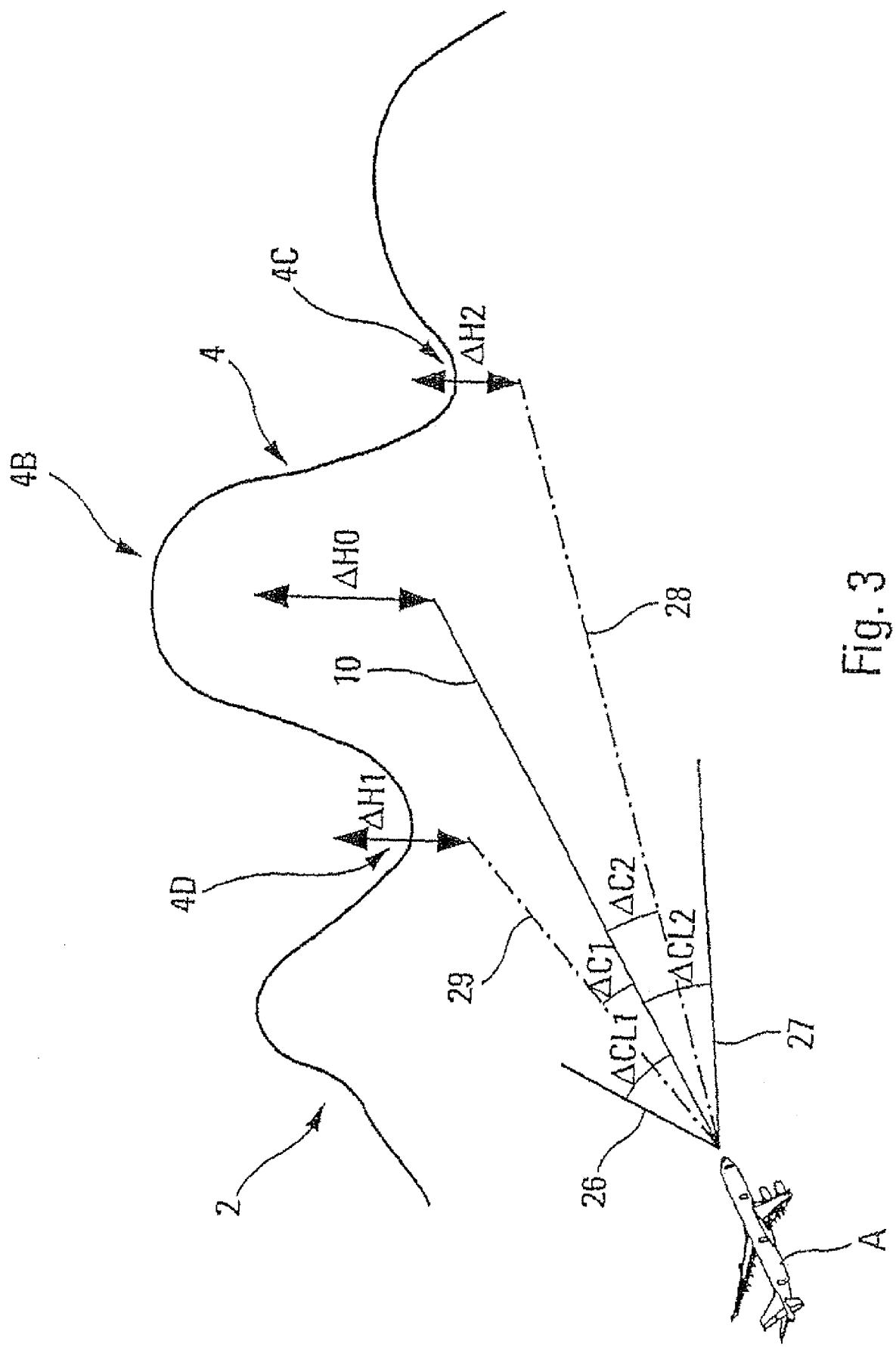
Figure 4:
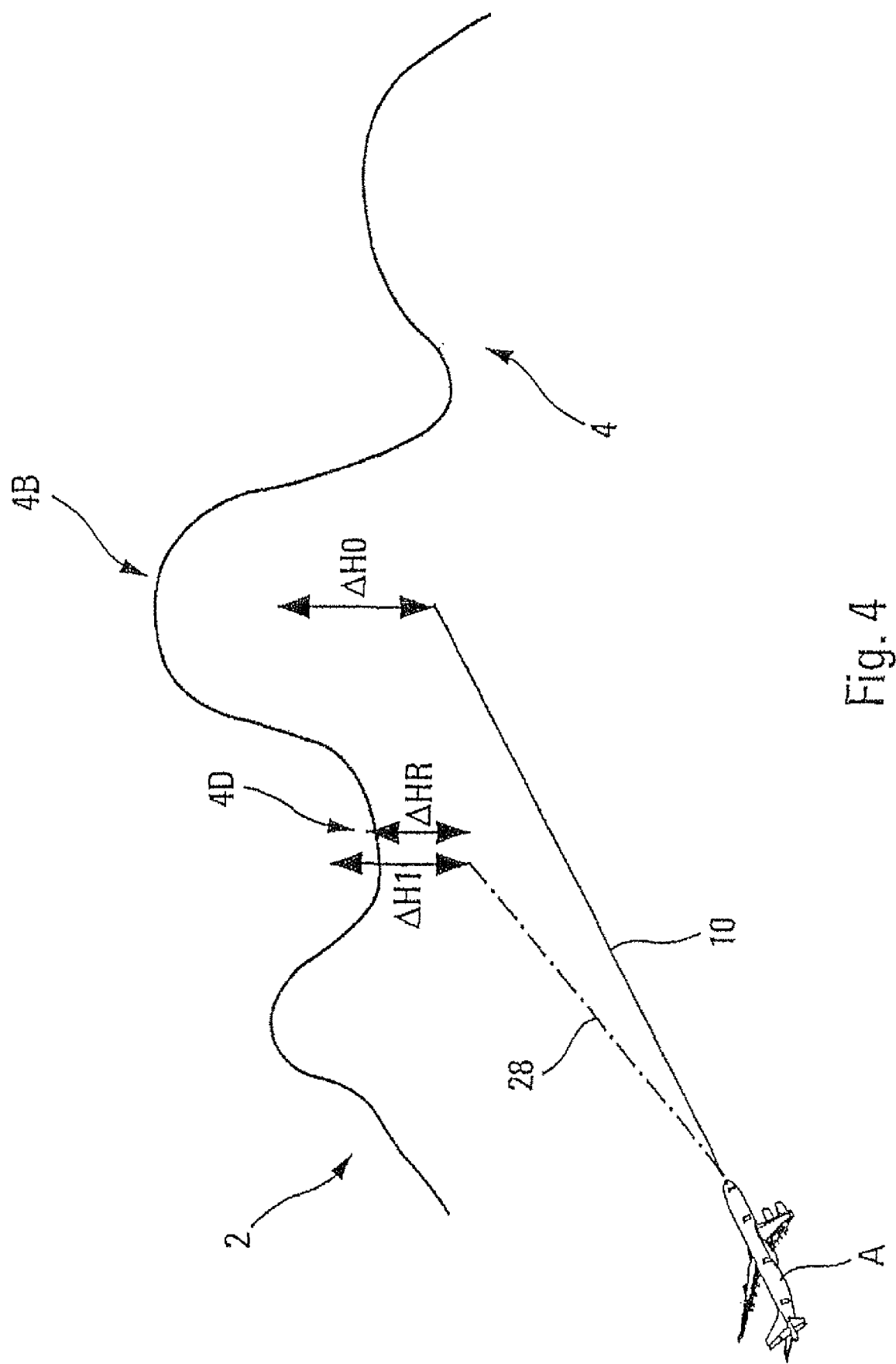

According to the invention, said automatic piloting device 5 comprises at least the following means, which are in particular activated when said collision warning device 3 transmits a warning signal:
- a means 7 for determining, in the usual manner, an optimal slope climb command for the aircraft A, with respect to the actual performance of said aircraft A;
- a means 8 which is connected by a connection 9 to said means 7, for checking if a first altitude gain $\Delta H0$ (which is obtained at the relief 4 by the aircraft A when there is applied to it said optimal slope climb command determined by said means 7, simultaneously with a command to maintain the current heading illustrated by a line 10 in FIGS. 2 to 4) is sufficient to clear said relief 4 (for example a peak 4A in the situation shown in FIG. 2);
- a means 11 which is connected by a connection 12 to said means 8 for finding out, when said altitude gain $\Delta H0$ is not sufficient to clear said relief 4, if there is at least one heading variation value $\Delta Ci$, i being an integer greater than or equal to 1, for which a corresponding altitude gain $\Delta Hi$ (which is obtained at the relief 4 by the aircraft A when an optimal slope climb command is applied to it) is sufficient to clear said relief 4;
- a means 13 which is connected by a connection 14 to said means 11, for selecting in the way described below, from among the various heading variation values $\Delta Ci$ found by said means 11, one of these heading variation values. When the means 11 finds only one single possible heading variation value, said means 13 of course selects this single value;
- a means 15 which is connected by a connection 16 to said means 13 for determining a particular climb command as defined below, as well as a heading command which makes it possible to change the heading of the aircraft A in accordance with the heading variation value selected by the means 13; and
- a means 17, for example a switching means, which is controlled by the means 8, as represented by a connection 18 shown in dotted and dashed line in FIG. 1, and whose purpose is to transmit climb and heading commands according to this control.

More specifically, said means 17 is connected by connections 19 and 20 to said means 7 and 15 respectively and it transmits by the intermediary of a connection 21 a climb command and a heading command, which are such that they correspond:

- if said altitude gain $\Delta H0$ is sufficient to clear said relief 4, to said optimal slope climb command determined by said means 7, with a command to maintain the current heading of the aircraft A; and
- if said altitude gain $\Delta H0$ is not sufficient to clear said relief 4, to the commands determined by said means 15, namely said particular climb command which is sufficient to clear the relief 4, and said heading command which corresponds to the heading variation value selected by said means 13.

In the context of the present invention, the optimal slope climb command is determined taking account of an associated thrust command in order to be able to maximize the slope. The maximal slope corresponding to the current thrust of the aircraft A not necessarily being the highest, the system 1 determines a thrust command for which the maximal slope is the highest possible.

Moreover, in the context of the present invention an altitude gain corresponds to the difference between the altitude obtained at the relief 4 and the current altitude of the aircraft A.

Moreover, an optimal slope climb command can be defined as follows: during a first time, the aircraft A is made to climb with a maximal angle of incidence, then it is made to climb at maximal slope. Preferably, the duration of this first time is chosen in such a way as to maximize the height that can be cleared at the relief 4.

Said terrain avoidance system 1 of course also comprises means 22 (which can for example be integrated, at least partially, in the automatic piloting device 5) which apply in the usual manner to said aircraft A the climb command and the heading command received by the intermediary of said connection 21. In order to do this, said means 22 of usual type comprise, for example, a means of calculating in order to determine control surface setting commands, on the basis of said climb and heading commands, and at least one means of actuating at least one control surface which receives this control surface setting command and moves said control surface in a corresponding way in order to apply said climb and heading commands to the aircraft A.

In a particular embodiment, said automatic piloting device 5 is part of a usual automatic pilot of the aircraft A.

Moreover, in a preferred embodiment, said terrain avoidance system 1 furthermore comprises a means of indication 23 which is, for example, connected by a connection 24 to said automatic piloting device 5 and whose purpose is to warn a pilot of the aircraft A when a heading variation command determined by the means 15 is applied to the latter. This information can for example be formed visually by means of a display screen 25 which is fitted in the cockpit of the aircraft A and/or in an audio way using a normal means which is not shown.

In the example shown in FIG. 2, the altitude gain $\Delta H0$ which is obtained at the relief 4, which is in front of the aircraft A in the direction of its current heading (line 10), is sufficient to clear the corresponding peak 4A of said relief 4. In this example, the means 17 transmits to the means 22 the commands coming from said means 7, namely an optimal slope climb command and a command to maintain the current heading of the aircraft A. In this case, the avoidance of the terrain 2 is therefore carried out in a simplified manner, simply by implementing a climb of the aircraft A without modifying its lateral flight path (maintaining the current heading).

On the other hand, in the examples of FIGS. 3 and 4, the altitude gain $\Delta H0$ obtained at the relief by application to the aircraft A of an optimal slope climb command whilst maintaining the heading (line 10) is not sufficient to clear the corresponding peak 4B of said relief 4. In this case, the means 17 transmits to the means 22 the climb command and the heading command which are determined by the means 15.

As mentioned previously, the heading command which is generated by the means 15 has the purpose of modifying the heading of the aircraft A in accordance with the heading variation value selected by the means 13 from among the plurality of possible heading variation values $\Delta Ci$ found by the means 11.

In a preferred embodiment, said means 13 selects (from among all of the heading variation values $\Delta Ci$ found) the smallest heading variation value in absolute value which makes it possible to divert the aircraft A as little as possible from its current heading (line 10), that is to say from the initially predicted lateral flight path. In the example of FIG. 3, the means 11 has found two heading variation values $\Delta C1$ and $\Delta C2$. According to this preferred embodiment, the means 13 selects, in this example, the heading variation $\Delta C1$ which has the smallest absolute value.

Within the context of the present invention, it is of course possible to envisage other variants of selection of the heading variation value, implemented by said means 13. In particular:

in a first variant, said means 13 selects the heading variation value which corresponds to the lowest relief and which is situated within a predetermined heading variation range ($\Delta CL1+\Delta CL2$ in FIG. 3) which is defined on either side of the current heading (line 10) of the aircraft A and which is limited by segments 26 and 27. In the example of FIG. 3, the part 4C of the relief 4 which is in the direction 28 defined by the heading variation $\Delta C2$ is lower than the part 4D of the relief 4 which is in the direction 29 defined by the heading variation $\Delta C1$ such that the means 13 selects the heading variation $\Delta C2$ in this first variant;

in a second variant, said means 13 selects the heading variation value for which the roll angle necessary for the corresponding change of heading is, in absolute value, less than a predetermined value, for example 45°, in order not to degrade the climb performance of the aircraft A too much.

Moreover, said means 15 also determines a particular climb command which is associated with said heading variation command determined in the previously described manner.

In a first simplified embodiment, said particular climb command determined by the means 15 corresponds simply to an optimal slope climb command. For a same optimal climb command, at a substantially equal distance from the relief 4, the altitude gain $\Delta H2$ and $\Delta H1$ obtained for a heading variation is of course less than the altitude gain $\Delta H0$ obtained without heading variation, because of the energy used by the aircraft A in order to carry out the heading variation (FIG. 3).

In a second embodiment, said means 15 determines, as a particular climb command, a climb command (at a non-maximal slope) which generates an altitude gain $\Delta HR$, at the relief 4, which corresponds to an altitude gain that is both necessary for clearing the corresponding part 4D of the relief 4 and that is also sufficient taking account of the usual regulation safety margins and less than said altitude gain $\Delta H1$ relating to a maximal slope climb, as shown in FIG. 4. In this second embodiment, the first step is preferably to determine a heading (or route) value making it possible to minimize the route diversion of the aircraft A, and then a climb command (at non-maximal slope) is determined making it possible to clear said relief 4 whilst minimizing the change of slope (passenger comfort).

This second embodiment therefore makes it possible to improve passenger comfort (because of a low slope and of a low acceleration) without this however being prejudicial to the safety of the aircraft A, since the corresponding altitude gain $\Delta HR$ is sufficient to clear the relief 4 (part 4D). This second embodiment of course applies solely in the case where the altitude gain necessary to clear the relief is less than the altitude gain $\Delta H1$ obtained on applying an optimal slope climb command to the aircraft A.

Moreover, in a particular embodiment, said automatic piloting device 5 (or said means 22) firstly applies said particular climb command to the aircraft A and then said heading command generating a change of heading. This makes it possible to anticipate the climb command as early as possible and therefore to maximize the altitude gain obtained at the relief 4.

Moreover, in a particular embodiment, when said collision warning device 3 transmits a warning signal, the system 1 modifies the aerodynamic configuration of the aircraft A in such a way as to increase the altitude gain at the relief 4, and the means 7 determines an optimal slope climb command, taking account of the new aerodynamic configuration of the aircraft A (resulting from this modification). This particular embodiment makes it possible to increase the altitude gain obtained at the relief 4. This embodiment can in particular be applied to an aircraft during an approach to an airport, for which the undercarriages, the slats, the flaps and/or the spoilers of the aircraft are deployed. In this case, the modification of the aerodynamic configuration sometimes consists simply in retracting these various elements (undercarriages, slats, flaps, spoilers) in order to obtain a higher climb slope. However, in certain situations, it is more advantageous to leave certain elements at least partially deployed (in particular slats or flaps). In fact, the aerodynamic configuration of the aircraft A is modified in such a way as to optimize the climb performance of said aircraft A. The modification of the aerodynamic configuration can be carried out either automatically or by the pilot (by procedure).

The terrain avoidance system 1 according to the present invention acts on the flight path of the aircraft A, as soon as a risk of collision with the relief 4 of the terrain 2 has been detected, and this action is carried out automatically, that is to say without the intervention of the pilot. Thus, as soon as a warning signal is transmitted by the collision warning device 3, said system 1 acts in such a way as to improve the situation of the aircraft A with respect to the terrain 2, by applying to it a climb command, generally an optimal slope climb command (with respect to the performance of the aircraft A).

In order to do this, according to the invention:

if such an action is sufficient to clear said relief 4, the system 1 simply applies an optimal slope climb command to the aircraft A without modifying its heading, which makes it possible to carry out a simplified avoidance maneuver (FIG. 2); and if the above simplified maneuver is not sufficient to clear said relief 4, which can happen in certain circumstances (relief 4 very high, etc), the system 1 modifies the heading of the aircraft A in order to steer it in a direction where said relief 4 is not too high, and it applies to it a particular climb command which is at least sufficient to clear the relief 4 in that direction (FIGS. 3 and 4).

Consequently, the system 1 according to the invention in principle makes it possible for the aircraft A to clear any relief 4 which is situated in front of it.

It will be noted that, on emerging from a conflict (disappearance of a warning signal), said system 1 preferably returns the aircraft A into an operational flight envelope.

Moreover, said system 1 furthermore comprises a means (not shown) making it possible for a pilot to disengage it. In this case, said system 1 can inform the pilot how to carry out the altitude and heading variations necessary to avoid the relief 4 (for example by means of a normal altitude and direction indicator which would indicate the attitude and heading to assume).

The invention claimed is:

1. A terrain avoidance method for an aircraft, in which a collision warning device is used which monitors flight of the aircraft with respect to a surrounding terrain and which is configured to transmit a warning signal when there is a risk of a collision between the aircraft and a relief of the terrain by maintaining its current flight characteristics, a method according to which, when said collision warning device transmits a warning signal, automatically, comprising:

A/ determining an optimal slope climb command for the aircraft;

B/ checking if a first altitude gain which is obtained at said relief by the aircraft, by applying said optimal slope climb command to said first altitude gain with a command to maintain a current heading, is sufficient to clear said relief; and C/ according to the check, if said first altitude gain is not sufficient to clear said relief, performing a search to determine if there is at least one heading variation value for which a second altitude gain which is obtained at the relief by the aircraft on applying to it an optimal slope climb command, is sufficient to clear said relief, wherein in step C:

a) if said first altitude gain is sufficient to clear said relief, said optimal slope climb command is automatically applied to the aircraft with a command to maintain the current heading; and b) if said first altitude gain is not sufficient to clear said relief, and if there is at least one heading variation value for which a second altitude gain which is obtained at the relief by the aircraft, on applying to it an optimal slope climb command, is sufficient to clear said relief:

α) automatically selecting one of said heading variation values allowing the aircraft to clear the relief; and β) automatically applying a particular climb command which is sufficient to clear the relief to the aircraft with a heading command which corresponds to the heading variation value selected.

2. The method as claimed in claim 1, wherein said particular climb command applied to the aircraft, in step C.b.β, corresponds to said optimal slope climb command.

3. The method as claimed in claim 1, wherein said particular climb command applied to the aircraft, in step C.b.β, is determined as a climb command generating an altitude gain at the relief which corresponds to an altitude gain that is sufficient to clear said relief.

4. The method as claimed in claim 1, wherein, in step C.b.α, selecting the heading variation value which is smallest in absolute value.

5. The method as claimed in claim 1, wherein, in step C.b.α, selecting the heading variation value which corresponds to a lowest relief and which is situated within a predetermined heading variation range, defined on either side of the current heading of the aircraft.

6. The method as claimed in claim 1, wherein, in step C.b.α, selecting the heading variation value for which a roll angle necessary for a corresponding change of heading is, in absolute value, less than a predetermined value.

7. The method as claimed in claim 1, wherein, in step C.b.β, applying said particular climb command, followed by applying said heading command generating a heading variation.

8. The method as claimed in claim 1, wherein, when said collision warning device transmits a warning signal, an aerodynamic configuration of the aircraft is modified to increase the altitude gain at the relief, and, in step A, an optimal slope climb command is determined, taking into account the modified aerodynamic configuration of the aircraft.

9. The method as claimed in claim 1, wherein when, in step C.b.β, a heading command generating a heading variation is applied, and an indication signal is transmitted in the cockpit of the aircraft to inform a pilot of the application of the heading command.

10. The method as claimed in claim 1, wherein, when a risk of collision disappears, the aircraft is returned into an operational flight envelope.

11. A terrain avoidance system for an aircraft comprising:

a collision warning device monitoring a flight of the aircraft with respect to surrounding terrain and configured to transmit a warning signal when there is a risk of collision between the aircraft and a relief of the terrain if said aircraft maintains its current flight characteristics; and an automatic piloting device of the aircraft, comprising:

a first means determination unit determining an optimal slope climb command for the aircraft;

a checking unit checking if a first altitude gain which is obtained by the aircraft at said relief, on applying to said first altitude gain said optimal slope climb command while maintaining the current heading, is sufficient to clear said relief;

a finding unit finding out, when said first altitude gain is not sufficient to clear said relief, if there is at least one heading variation value for which a second altitude gain which is obtained at the relief by the aircraft, on applying to said second altitude gain an optimal slope climb command, is sufficient to clear said relief, wherein said automatic piloting device further comprises:

a selection unit for automatically selecting one of said heading variation values allowing the aircraft to clear the relief; and a switching and calculating unit for automatically applying to the aircraft a climb command and a heading command wherein:

if said first altitude gain is sufficient to clear said relief, said optimal slope climb command with a command to maintain the current heading; and if said altitude gain is not sufficient to clear said relief, a particular climb command which is sufficient to clear the relief, with a heading command which corresponds to the heading variation value selected by said selection unit.

12. The system as claimed in claim 11, further comprising an indication unit automatically signaling application of the heading command generating a heading variation.

13. The system as claimed in claim 11, further comprising an optimization unit optimizing the aerodynamic configuration.

14. The system as claimed in claim 11, further comprising a disengaging unit configured to allow the pilot to disengage the automatic pilot.

15. The system as claimed in claim 11, wherein said automatic piloting device is part of an automatic pilot of the aircraft.

16. An aircraft, comprising a system as claimed in claim 11.

17. An aircraft, comprising a system implementing the method claimed in claim 1.

18. A terrain avoidance method for an aircraft, in which a collision warning device is used which monitors flight of the aircraft with respect to a surrounding terrain and which is configured to transmit a warning signal when there is a risk of a collision between the aircraft and a relief of the terrain by maintaining its current flight characteristics, a method according to which, when said collision warning device transmits a warning signal, automatically, comprising:

A/ determining an optimal slope climb command for the aircraft;

B/ checking if a first altitude gain which is obtained at said relief by the aircraft, by applying said optimal slope climb command to said first altitude gain with a command to maintain a current heading, is sufficient to clear said relief; and C/ according to the check, if said first altitude gain is not sufficient to clear said relief, performing a search to determine if there is at least one heading variation value for which a second altitude gain which is obtained at the relief by the aircraft, on applying to it an optimal slope climb command, is sufficient to clear said relief, wherein in step C:

a) if said first altitude gain is sufficient to clear said relief, said optimal slope climb command is automatically applied to the aircraft with a command to maintain the current heading; and b) if said first altitude gain is not sufficient to clear said relief, and if there is at least one heading variation value for which a second altitude gain which is obtained at the relief by the aircraft, on applying to it an optimal slope climb command, is sufficient to clear said relief:

α) automatically selecting one of said heading variation values allowing said aircraft to clear the relief; and β) automatically applying a particular climb command which is sufficient to clear the relief to the aircraft with a heading command which corresponds to the heading variation value selected, wherein, in step C.b.α, selecting the heading variation value which is smallest in absolute value.

* * * * *